US009003200B1

(12) United States Patent
Gardner

(10) Patent No.: US 9,003,200 B1
(45) Date of Patent: Apr. 7, 2015

(54) AVOIDING ENCRYPTION OF CERTAIN BLOCKS IN A DEDUPLICATION VAULT

(71) Applicant: Storagecraft Technology Corporation, Draper, UT (US)

(72) Inventor: Andrew Lynn Gardner, Oak City, UT (US)

(73) Assignee: Storagecraft Technology Corporation, Draper, UT (US)

( * ) Notice: Subject to any disclaimer, the term of this patent is extended or adjusted under 35 U.S.C. 154(b) by 0 days.

(21) Appl. No.: 14/493,028

(22) Filed: Sep. 22, 2014

(51) Int. Cl.
G06F 21/60 (2013.01)
G06F 11/14 (2006.01)
G06F 12/14 (2006.01)

(52) U.S. Cl.
CPC ........ *G06F 11/1453* (2013.01); *G06F 11/1464* (2013.01); *G06F 2201/845* (2013.01); *G06F 12/14* (2013.01)

(58) Field of Classification Search
CPC ... H04L 63/0471; H04L 9/0894; G06F 21/60; G06F 21/6218; G06F 11/1453; G06F 12/14
See application file for complete search history.

(56) References Cited

U.S. PATENT DOCUMENTS

| 4,907,275 | A | 3/1990 | Hashimoto |
| 5,008,935 | A | 4/1991 | Roberts |
| 8,190,921 | B1 | 5/2012 | Harwood et al. |
| 2004/0148512 | A1 | 7/2004 | Park et al. |
| 2006/0188099 | A1 | 8/2006 | Kondo et al. |
| 2007/0100913 | A1 | 5/2007 | Sumner et al. |
| 2007/0260891 | A1 | 11/2007 | Starr et al. |
| 2009/0164529 | A1* | 6/2009 | McCain ........................ 707/204 |
| 2009/0319772 | A1 | 12/2009 | Singh et al. |
| 2010/0083003 | A1* | 4/2010 | Spackman ..................... 713/193 |
| 2011/0010498 | A1* | 1/2011 | Lay et al. ....................... 711/115 |
| 2012/0159175 | A1* | 6/2012 | Yocom-Piatt et al. ......... 713/176 |

FOREIGN PATENT DOCUMENTS

| JP | 2005/202048 | 7/2005 |
| JP | 2007/189659 | 7/2007 |
| JP | 2008/301204 | 12/2008 |

OTHER PUBLICATIONS

Aruljothi, Symmetric key cryptosystem based on randomized block cipher, May 21-23, 2010, Conference Publications pp. 1-5.
Wang, SEDBRS: a secure and efficient desktop backup and recovery system, Nov. 1-3, 2007, Conference Publications pp. 304-309.

* cited by examiner

*Primary Examiner* — Jung Kim
*Assistant Examiner* — Robert Leung
(74) *Attorney, Agent, or Firm* — Maschoff Brennan

(57) ABSTRACT

Avoiding encryption of certain blocks in a deduplication vault. In one example embodiment, a method of avoiding encryption of certain blocks during a backup of a source storage into a deduplication vault storage may include analyzing each allocated plain text block stored in a source storage at a point in time to determine if the allocated plain text block is already stored in the deduplication vault storage. If the allocated plain text block is not stored in the deduplication vault storage, the block may be encrypted and the encrypted block may be analyzed to determine if the encrypted block is already stored in the deduplication vault storage. If neither the allocated plain text block nor the encrypted block is already stored in the deduplication vault storage, the encrypted block may be stored in the deduplication vault storage.

11 Claims, 4 Drawing Sheets

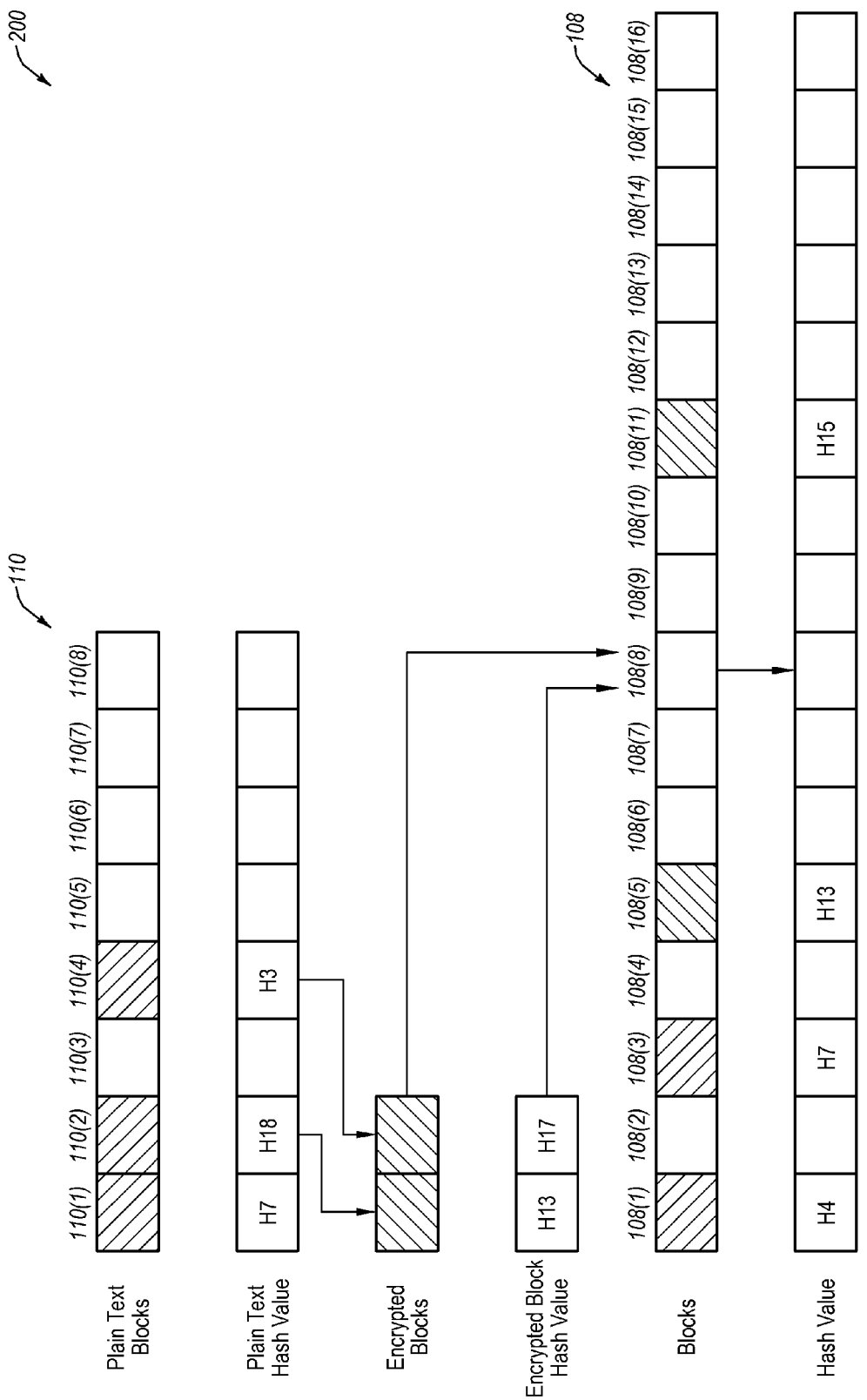

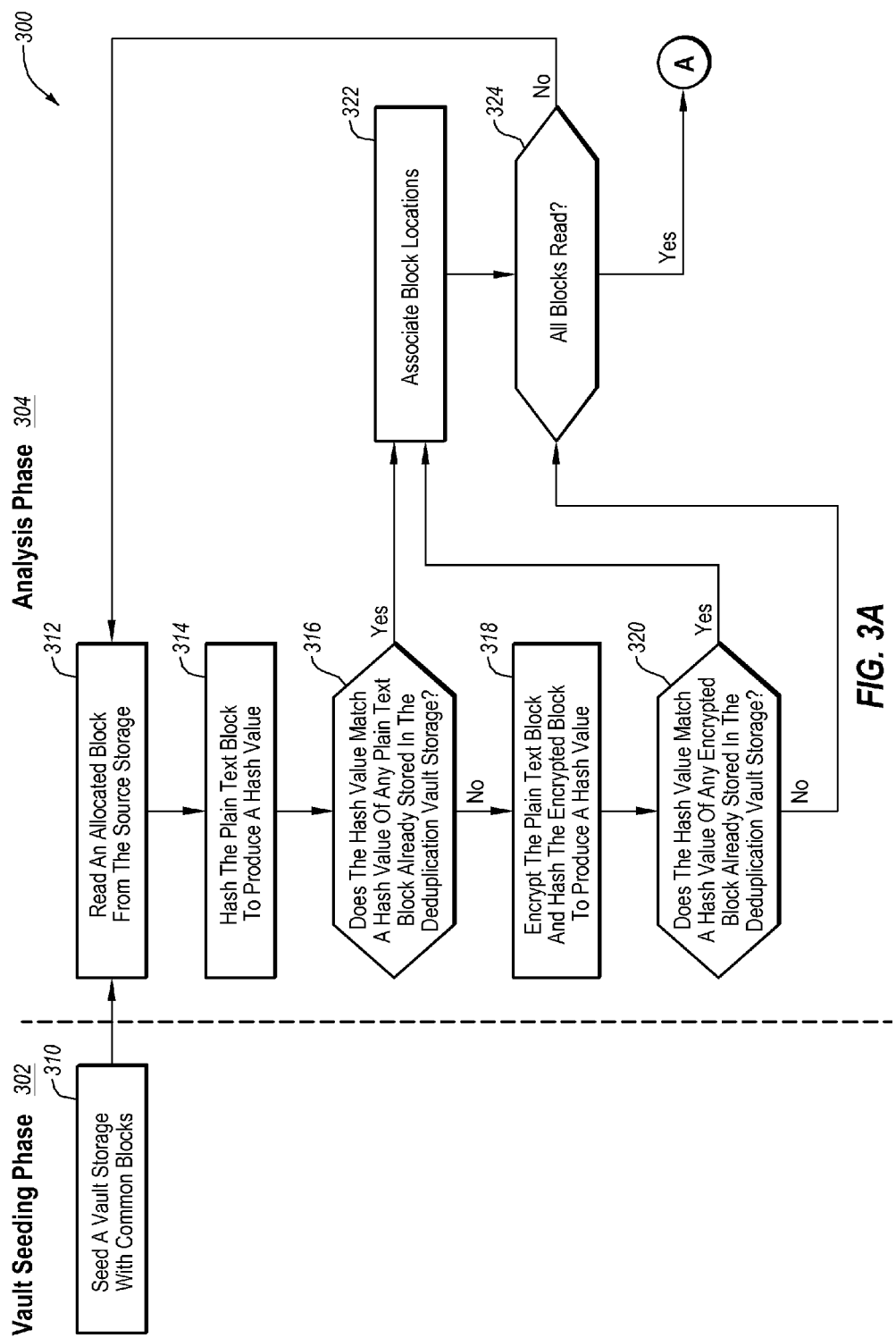

AVOIDING ENCRYPTION OF CERTAIN BLOCKS IN A DEDUPLICATION VAULT

FIELD

The embodiments disclosed herein relate to avoiding encryption of certain blocks in a deduplication vault.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

One common problem encountered when backing up multiple similar source storages to the same backup storage using image backup is the potential for redundancy within the backed-up data. For example, if multiple source storages utilize the same commercial operating system, such as WINDOWS® XP Professional, they may store a common set of system files which will have identical blocks. If these source storages are backed up to the same backup storage, these identical blocks will be stored in the backup storage multiple times, resulting in redundant blocks. Redundancy in a backup storage may increase the overall size requirements of backup storage and increase the bandwidth overhead of transporting blocks to the backup storage.

While this redundancy problem can be mitigated to a certain extent through the use of a deduplication vault, a standard deduplication vault can leave sensitive blocks vulnerable to discovery by unauthorized users, such as other users of the standard deduplication vault. For this reason, encrypted deduplication vaults have been developed in which each block is encrypted prior to backing up the block into an encrypted deduplication vault.

While encrypted deduplication vaults have alleviated the concerns regarding unauthorized access to sensitive blocks, the overhead associated with encrypting each block prior to backup of the block, and then decrypting each block prior to the restore of the block, is significant. In addition, in order to determine if a block is already stored in the deduplication vault storage, the block must be encrypted and analyzed.

Another common problem encountered during backup into an encrypted deduplication vault is that encrypted blocks may not be capable of deduplication across different clients depending on the encryption key used in encrypting the blocks. While the blocks that make up a commercial operating system or a standard application may be identical in their plain text form, different encryption keys can result in differences in the encrypted version of the block. Thus, even if an identical plain text block is backed up across different source storages, the encrypted block that is actually stored in the deduplication vault may be different for each source storage, resulting in the encrypted block being stored multiple times. As a result, the benefits of deduplication may be lost even when identical blocks are being backed up because different source systems may use different keys to encrypt identical blocks.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to avoiding encryption of certain blocks in a deduplication vault. The example methods disclosed herein may be employed to enable deduplication of common blocks, such as blocks that make up common operating system files and common application files, by storing the common blocks in a deduplication vault storage in plain text. At the same time, sensitive blocks may be stored in the deduplication vault as encrypted blocks. In addition, common blocks may be seeded into the deduplication vault storage in a plain text or may be designated by an administrator or user of the vault as plain text blocks. Further, encrypted blocks that are associated with different source storages on different source systems may be identified by the deduplication module as potentially common blocks. The overhead associated with encrypting blocks prior to analyzing if the blocks are already stored in the deduplication vault may be avoided if the blocks make up files that are common files, such operating system files, common application files, or files that have been designated as common files and are stored in the deduplication vault in plain text. In addition, there may be less overhead associated with restore operations as the common blocks stored in plain text in the deduplication vault storage may not need to be decrypted prior to restoration in a restore storage.

In addition, storing common blocks as plain text blocks in a deduplication vault storage may allow increased deduplication across clients that use different keys to encrypt blocks that are stored in the deduplication vault storage. This may increase the number of blocks from a source storage that are already duplicated in the deduplication vault storage at the time that a backup of the source storage is created in the deduplication vault storage, thereby decreasing the number of blocks that must be copied from the source storage to the deduplication vault storage. Decreasing the number of blocks that must be copied from the source storage to the deduplication vault storage during the creation of a backup may result in decreased bandwidth overhead of transporting blocks to the deduplication vault storage and increased efficiency and speed during the creation of each backup.

In one example embodiment, a method of avoiding encryption of certain blocks during a backup of a source storage into a deduplication vault storage may include analyzing each allocated plain text block stored in a source storage at a point in time to determine if the allocated plain text block is already stored in the deduplication vault storage. If the allocated plain text block is not stored in the deduplication vault storage, the block may be encrypted and the encrypted block may be analyzed to determine if the encrypted block is already stored in the deduplication vault storage. If neither the allocated plain text block nor the encrypted block is already stored in the deduplication vault storage, the encrypted block may be stored in the deduplication vault storage.

In another example embodiment, a method of avoiding encryption of certain blocks during a backup of a source storage into a deduplication vault storage may include seeding a deduplication vault storage with common plain text blocks and analyzing each allocated plain text block stored in a source storage at a point in time to determine if the allocated plain text block is already stored in the deduplication vault storage. If the allocated plain text block is not stored in the deduplication vault storage, the block may be encrypted and the encrypted block may be analyzed to determine if the encrypted block is already stored in the deduplication vault storage. If neither the allocated plain text block nor the encrypted block is already stored in the deduplication vault storage, the encrypted block may be stored in the deduplication vault storage.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which:

FIG. 2 is a schematic diagram illustrating an example method of avoiding encryption of certain blocks during a backup of a source storage into a deduplication vault storage; and FIGS. 3A and 3B are a schematic flowchart illustrating an example method for avoiding encryption of certain bocks during a backup of a source storage into a deduplication vault storage.

DESCRIPTION OF EMBODIMENTS

The term "storage" as used herein refers to computer-readable media, or some logical portion thereof such as a volume, capable of storing data in blocks. The term "block" as used herein refers to a fixed-length discrete sequence of bits. The term "backup," when used herein as a noun, refers to a copy or copies of one or more blocks from a storage. The term "base backup" as used herein refers to a base backup of a storage that includes at least a copy of each unique allocated block of the storage at a point in time such that the base backup can be restored to recreate the state of the storage at the point in time. A "base backup" may also include nonunique allocated blocks and free blocks of the storage at the point in time. The term "incremental backup" as used herein refers to an at least partial backup of a storage that includes at least a copy of each unique allocated block of the storage that changed between a previous point in time of a previous backup of the storage and the subsequent point in time of the incremental backup such that the incremental backup, along with all previous backups of the storage including an initial base backup of the storage, can be restored together to recreate the exact state of the storage at the subsequent point in time. An "incremental backup" may also include nonunique allocated blocks and free blocks of the storage that changed between the previous point in time and the subsequent point in time. Only "unique allocated blocks" may be included in a "base backup" or an "incremental backup" where only a single copy of multiple duplicate allocated blocks (i.e., nonunique allocated blocks) is backed up to reduce the size of the backup. A "base backup" or an "incremental backup" may exclude certain undesired allocated blocks such as blocks belonging to files whose contents are not necessary for restoration purposes, such as virtual memory pagination files and machine hibernation state files.

Figure 1:
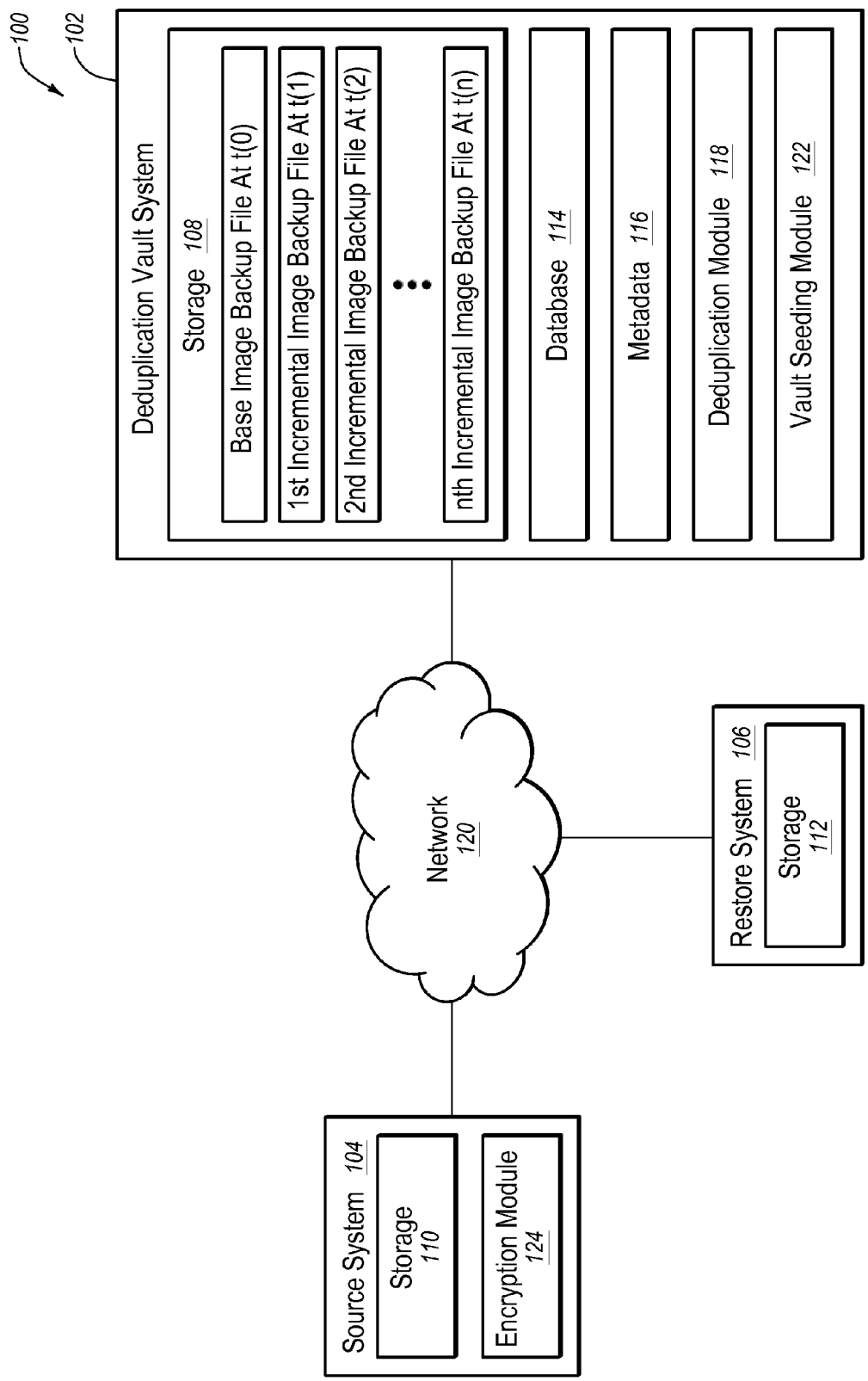
FIG. 1 is a schematic block diagram illustrating an example image backup system.

FIG. 1 is a schematic block diagram illustrating an example deduplication backup system 100. As disclosed in FIG. 1, the example deduplication backup system 100 includes a deduplication vault system 102, a source system 104, and a restore system 106. The systems 102, 104, and 106 include storages 108, 110, and 112, respectively. The deduplication vault storage 108 stores a base backup and multiple incremental backups that have been created of the source storage 110 at various points in time. For example, the base backup was created at time t(0), the 1st incremental backup was created at time t(1), the 2nd incremental backup was created at time t(2), and the nth incremental backup was created at time t(n). The deduplication vault system 102 also includes a database 114, metadata 116, a deduplication module 118, and a vault seeding module 122. The source system 104 also includes an encryption module 124. The systems 102, 104, and 106 are able to communicate with one another over a network 120.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 120 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

The image backup files stored in the deduplication vault storage 108 may be created by the deduplication module 118. For example, the deduplication module 118 may be configured to execute computer instructions to perform image backup operations of creating a base backup and multiple incremental backups of the source storage 110. It is noted that these image backups may initially be created on the source system 104 and then copied to the deduplication vault system 102.

For example, the base backup may be created to capture the state at time t(0). This image backup operation may include the deduplication module 118 copying all allocated blocks of the source storage 110 as allocated at time t(0) and storing the allocated blocks in the deduplication vault storage 108. The state of the source storage 110 at time t(0) may be captured using snapshot technology in order to capture the blocks stored in the source storage 110 at time t(0) without interrupting other processes, thus avoiding downtime of the source storage 110. The base backup may be very large depending on the size of the source storage 110 and the number of allocated blocks at time t(0). As a result, the base backup may take a relatively long time to create and consume a relatively large amount of space in the duplication vault storage 108.

Next, the 1st and 2nd incremental backups may be created to capture the states at times t(1) and t(2), respectively. This may include copying only changed allocated blocks of the source storage 110 present at time t(1) and storing the changed allocated blocks in the deduplication vault storage 108, then later copying only changed allocated blocks of the source storage 110 present at time t(2) and storing the changed allocated blocks in the deduplication vault storage 108. The states of the source storage 110 at times t(1) and t(2) may again be captured using snapshot technology, thus avoiding downtime of the source storage 110. Each incremental backup may include only those allocated blocks from the source storage 110 that were changed after the time of the previous backup. Thus, the 1st incremental backup may include only those allocated blocks from the source storage 110 that changed between time t(0) and time t(1), and the 2nd incremental backup may include only those allocated blocks from the source storage 110 that changed between time t(1) and time t(2). In general, as compared to the base backup, each incremental backup may take a relatively short time to create and consume a relatively small storage space in the deduplication vault storage 108.

Finally, an nth incremental backup may be created to capture the state at time t(n). This may include copying only changed allocated blocks of the source storage 110 present at time t(n), using snapshot technology, and storing the changed allocated blocks in the deduplication vault storage 108. The nth incremental backup may include only those allocated blocks from the source storage 110 that changed between time t(n) and time t(n−1).

Therefore, incremental backups may be created on an ongoing basis. The frequency of creating new incremental backups may be altered as desired in order to adjust the amount of data that will be lost should the source storage 110 experience corruption of its stored blocks or become unavailable at any given point in time. The blocks from the source storage 110 can be restored to the state at the point in time of a particular incremental backup by applying the image backup files to a restore storage from oldest to newest, namely, first applying the base backup and then applying each successive incremental backup up to the particular incremental backup. The restore system 106 may be the source system 104 or some other system. The restore storage 112 may be the source storage 110 or some other storage.

Although only allocated blocks are included in the example incremental backups discussed above, it is understood that in alternative implementations both allocated and unallocated blocks may be backed up during the creation of a base backup or an incremental backup. This is typically done for forensic purposes, because the contents of unallocated blocks can be interesting where the unallocated blocks contain data from a previous point in time when the blocks were in use and allocated. Therefore, the creation of base backups and incremental backups as disclosed herein is not limited to allocated blocks but may also include unallocated blocks.

Further, although only base backups and incremental backup files are discussed above, it is understood that the source storage 110 may instead be backed up by creating a base backup and one or more decremental image backup files. Decremental backups are created by initially creating a base backup to capture the state at an initial point in time, then updating the base backup to capture the state at a subsequent point in time by modifying only those blocks in the base backup that changed between the initial and subsequent points in time. Prior to the updating of the base backup, however, the original blocks in the base backup that correspond to the changed blocks are copied to a decremental backup, thus enabling restoration of the source storage 110 at the initial point in time (by restoring the updated base backup and then restoring the decremental backup) or at the subsequent point in time (by simply restoring the updated base backup). Since restoring a single base backup is generally faster than restoring a base backup and one or more incremental or decremental backups, creating decremental backups instead of incremental backups may enable the most recent backup to be restored more quickly since the most recent backup is always a base backup or an updated base backup instead of potentially being an incremental backup. Therefore, the methods disclosed herein are not limited to pruning base and incremental backups, but may also include pruning base and decremental backups.

During performance of the example methods disclosed herein, the vault seeding module 122 may seed, during one phase, the deduplication vault storage 108 with common blocks. These common blocks may be stored in a plain text form. Then the encryption module 124 may track incremental changes to the source storage 110 between backups of the source storage 110. For example, the encryption module 124 may track incremental changes to the source storage 110 between the time t(1) of the creation of the 1st incremental backup and the time t(2) of the creation of the 2nd incremental backup. The deduplication module 118 and/or the encryption module 124 may analyze, during a subsequent phase, the allocated blocks stored in the source storage 110 at a point in time to determine if the allocated blocks are already duplicated in the deduplication vault storage 108 in either an encrypted or plain text form and then back up, during another subsequent phase, those blocks from the source storage 110 that do not already have duplicate blocks stored in the deduplication vault storage 108.

The database 114 and the metadata 116 may be employed to track information related to the source storage 110, the deduplication vault storage 108, and the backup of the source storage 110 that is stored in the deduplication vault storage 108. For example, the database 114 and the metadata 116 may be identical in structure and function to the database 500 and the metadata 700 disclosed in related U.S. patent application Ser. No. 13/782,549, titled "MULTIPHASE DEDUPLICATION," which was filed on Mar. 1, 2013 and is expressly incorporated herein by reference in its entirety. Subsequently, the deduplication module 118 and/or the encryption module may restore, during yet another subsequent phase, each block that was stored in the source storage 110 at the point in time to the restore storage 112.

As discussed in greater detail below, avoiding encryption of certain blocks in a deduplication vault by seeding the deduplication vault storage 108 with common blocks of plain text data prior to the backing up of the source storage 110 may result in an increase in the number of blocks from the source storage 110 that are already duplicated in the deduplication vault storage 108, thereby decreasing the bandwidth overhead of transporting blocks to the deduplication vault storage 108 and increased efficiency and speed during the creation of the backup.

In one example embodiment, the deduplication vault system 102 may be a file server, the source system 104 may be a first desktop computer, the restore system 106 may be a second desktop computer, and the network 120 may include the internet. In this example embodiment, the file server may be configured to periodically back up the storage of the first desktop computer over the internet as part of a backup job by creating the base backup and the multiple incremental backups stored in the deduplication vault storage 108. The desktop computer may also be configured to track incremental changes to its storage between backups in order to easily and quickly identify only those blocks that changed during the creation of an incremental backup. The file server may also be configured to restore one or more of the image backup files to the storage of the second desktop computer over the internet if the first desktop computer experiences corruption of its storage or if the first desktop computer's storage becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 120, it is understood that the systems 102, 104, and 106 may instead communicate directly with each other. For example, in some embodiments any combination of the systems 102, 104, and 106 may be combined into a single system. Also, although the storages 108, 110, and 112 are disclosed as separate storages, it is understood that any combination of the storages 108, 110, and 112 may be combined into a single storage. For example, in some embodiments the storage 110 may function as both a source storage during the creation of a backup and a restore storage during a restore of the backup, which may enable the storage 110 to be restored to a state of an earlier point in time.

Further, although the deduplication module 118, the vault seeding module 122, and the encryption module 124 are the only modules disclosed in the example deduplication backup system 100 of FIG. 1, it is understood that the functionality of the modules 118, 122, and 124 may be replaced or augmented by one or more similar modules residing on any of the systems 102, 104, and 106 or another system. Finally, although only a single source storage and a single restore storage are disclosed in the example deduplication backup system 100 of FIG. 1, it is understood that the deduplication vault system 102 of FIG. 1 may be configured to simultaneously back up multiple source storages and/or to simultaneously restore to multiple restore storages. For example, the greater the number of storages that are backed up to the deduplication vault storage 108 of the deduplication vault system 102, the greater the likelihood for reducing redundancy and overall number of blocks being backed up, resulting in corresponding decreases in the bandwidth overhead of transporting blocks to the deduplication vault storage 108.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

FIG. 2 is a schematic diagram illustrating an example method 200 of avoiding encryption of certain blocks during a backup of the source storage 110 into the deduplication vault storage 108. The method 200 may be implemented, in at least some embodiments, by the encryption module 124 of the source system 104 of FIG. 1. For example, the encryption module may be configured to execute computer instructions to perform operations of analyzing plain text blocks and encrypted blocks in the source storage 110 and the deduplication vault storage 108. Alternately, the deduplication module 118 of the deduplication vault system or a combination of the encryption module 124 and the deduplication module 118 may be configured to implement the method 200. Prior to the method 200, the deduplication vault storage 108 may have been seeded with common blocks and various image backup operations of a backup job may have transpired, which will have resulted in at least the creation of a base backup in the deduplication vault storage 108 and may have also resulted in the creation of one or more incremental backups in the deduplication vault storage 108 (see FIG. 1).

Although the source storage 110 is depicted with eight blocks, it is understood that the source storage 110 may include millions or billions of blocks or potentially even more blocks. Also, although the deduplication vault storage 108 is depicted with sixteen blocks, it is understood that the deduplication vault storage 108 may include millions or billions of blocks or potentially even more blocks. Prior to or during the execution of a backup operation, a hash function may be used to calculate hash values for allocated blocks in the source storage 110 and blocks in the deduplication vault storage 108. Examples of commonly used hash functions include SHA-1, SHA-256, and SHA-512. Alternately, other hash functions or checksums could be used.

Prior to or during a backup operation, blocks in the source storage 110 that have potentially changed are tracked or identified. In this example, blocks 110(1), 110(2), and 110(4) are allocated blocks that have potentially changed since the last backup operation. In order to determine if the blocks are already duplicated on the deduplication vault storage 108, the hash values of the blocks may be compared against the hash values for blocks that are already stored in the deduplication vault storage 108. Hash values for blocks 110(1), 110(2), and 110(4) are generated using a hash function. The resulting plain text hash values for blocks 110(1), 110(2), and 110(4) are H7, H18, and H3 respectively.

The plain text hash values of blocks 110(1), 110(2), and 110(4) are then compared against the plain text hash values for blocks that are already stored in the deduplication vault storage 108. Because the plain text hash value of block 110(1), namely H7, matches the hash value of block 108(3), it is determined that block 110(1) is already stored in the deduplication vault storage 108 as a plain text block and another copy of the block will not be stored in the deduplication vault storage 108. As a result, block 110(1) may not be encrypted, thus avoiding the overhead of encrypting block 110(1).

In contrast, the plain text hash values for blocks 110(2) and 110(4), namely H18 and H3, respectively, do not match the hash values for any plain text blocks in the deduplication vault storage. Because there is no matching hash value, it is determined that the plain text blocks are not already stored on the deduplication vault storage. The blocks are then encrypted using an encryption function. Examples of commonly used encryption functions include AES-128, AES-192, and AES-256. The key used in the encryption function may be a user-chosen key or some other key. A hash function may then be used to calculate an encrypted block hash value for the encrypted forms of blocks 110(2) and 110(4). In this example, the hash value of the encrypted form of block 110(2) is H13 and the hash value of the encrypted form of block 110(4) is H17.

The encrypted block hash values are then compared against the encrypted block hash values for blocks that are already stored in the deduplication vault storage 108. Because the hash value of the encrypted form of block 110(2), namely H13, matches the hash value of block 108(5), it is determined that an encrypted copy of block 110(2) is already stored on the deduplication vault storage 108 and another copy of the block will not be stored in the deduplication vault storage 108.

In contrast, the hash value for the encrypted form of block 110(4), namely H17, does not match the hash value for any encrypted block in the deduplication vault storage 108. Because there is no matching hash value, it is determined that the encrypted block is not already stored in the deduplication vault storage 108. The encrypted form of block 110(4) and the encrypted block hash value may then be stored in the deduplication vault storage 108 at block 108(8), as indicated by the arrows in FIG. 2.

Figure 3B:
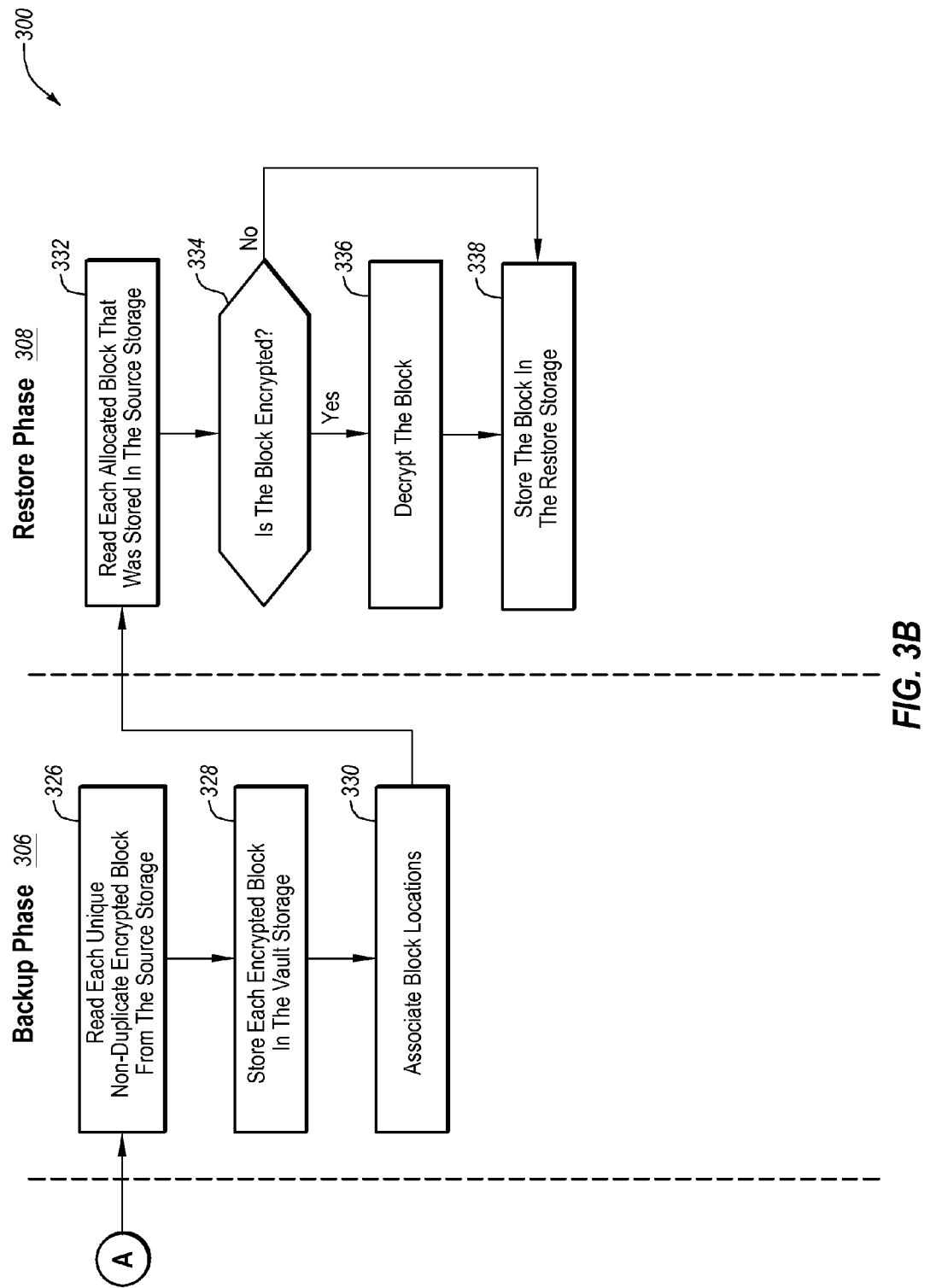

FIGS. 3A and 3B are a schematic flowchart illustrating an example method 300 for avoiding encryption of certain bocks during a backup of the source storage 110 into the deduplication vault storage 108. The method 300 may be implemented, in at least some embodiments, by the deduplication module 118 and the vault seeding module 122 of the deduplication vault system 102 and the encryption module 124 of the source system 104 of FIG. 1. For example, the modules may be configured to execute computer instructions to perform operations of seeding the deduplication vault storage 108 with common blocks prior to or during the creation of a backup of the source storage 110 and analyzing plain text blocks and encrypted blocks in the source storage 110 and the deduplication vault storage 108, as represented by one or more of phases 302-308 which are made up of the steps 310-338 of the method 300. Prior to the method 300, various image backup operations of a backup job may have transpired, which will have resulted at least in the creation of a base backup in the deduplication vault storage 108 and may have also resulted in the creation of one or more incremental backups in the deduplication vault storage 108 (see FIG. 1). Although illustrated as discrete phases and steps, various phases/steps may be divided into additional phases/steps, combined into fewer phases/steps, reordered, or eliminated, depending on the desired implementation. The method 300 will now be discussed with reference to FIGS. 1, 2, 3A, and 3B.

The method 300 may involve a vault seeding phase 302, an analysis phase 304, a backup phase 306, and a restore phase 308. The optional vault seeding phase 302 of the method 300 may include a step 310, in which a deduplication vault storage is seeded with common blocks, which may be plain text blocks. For example, the vault seeding module 122 may seed the deduplication vault storage 108 with common blocks. As noted previously, these common blocks may include blocks that make up one or more files of an operating system or a software application. Further, the blocks that make up the one or more files of the operating system or the software application in the deduplication vault storage 108 may be stored in the sequence of a clean install of the operating system or the software application. The common blocks may be stored as plain text blocks.

Further, where it is known in advance that a particular source storage will eventually be backed up to the vault storage, and the particular operating system and/or the particular software applications installed in the source storage are known, the particular operating system and/or the particular software applications can be included in the common blocks seeded into the vault storage. For example, where it is known in advance that the source storage 110 will eventually be backed up to the deduplication vault storage 108, and it is known that the Linux 3.6.6 operating system and the Adobe Reader and Firefox Browser software applications are installed in the source storage 110, the blocks that make up a clean install of the Linux 3.6.6 operating system and the blocks that make up clean installs of the Adobe Reader and the Firefox Browser software applications can be included in the common blocks seeded into the deduplication vault storage 108.

Seeding the deduplication vault storage 108 with common blocks of data prior to creation of a backup of the source storage during the analysis phase 304 and the backup phase 306 may result in an increase in the number of blocks from the source storage 110 that are already duplicated in the deduplication vault storage 108, thereby decreasing the bandwidth overhead of transporting blocks to the deduplication vault storage 108 and increased efficiency and speed during the creation of the backup. Seeding the deduplication vault storage 108 with blocks that make up one or more files of an operating system or a software application in the sequence of a clean install of the operating system or the software application may further increase the efficiency and speed of the restoration of a backup during the restore phase 308, as discussed in greater detail below. In addition, seeding the deduplication vault storage 108 with plain text common blocks may later require fewer steps in the analysis phase 304 when determining if a plain text block is already stored in the deduplication vault storage 108.

The performance and completion of the analysis phase 304 prior to the performance of the backup phase 306 may enable decreased fragmentation in the storing of the backup of the source storage 110 in the deduplication vault storage 108, resulting in increased efficiency and speed during an optional restore phase 308 in which the backup of the source storage 110 is restored to the restore storage 112.

The analysis phase 304 of the method 300 may begin at step 312, in which an allocated block is read from a source storage. For example, the deduplication module 118 may read an allocated block 110(1) from the source storage 110, as disclosed in FIG. 2.

At step 314, the encryption module 124 may use a hash function on the allocated block to generate a first hash value. Examples of commonly used hash functions include SHA-1, SHA-256, and SHA-512. Alternately, other hash functions or checksums could be used to generate a plain text hash value that may be compared against the hash values of the plain text blocks that are already stored in the deduplication vault storage 108. In addition, the allocated plain text block may be compressed prior to or after using the hash function to generate the first hash value.

At decision step 316 of the analysis phase it is determined whether the hash value matches a hash value of any plain text blocks already stored in the deduplication vault storage 108 to determine whether the block is duplicated among the plain text blocks in the deduplication vault storage 108. These blocks may have been stored in the deduplication vault storage 108 by the vault seeding module 122 in the vault seeding phase 302 or in a prior backup phase 306. The deduplication module 118 may, for example, use the first hash value calculated in step 314 to query the database 114 of the deduplication vault system 102 to determine whether a database element exists with a matching hash value. If a matching database element does exist, it is determined that the plain text block is duplicated in the deduplication vault storage 108 (Yes at step 316). If a matching database element does not exist, it is determined that the plain text block is not duplicated in the deduplication vault storage 108 (No at step 316).

If it is determined at step 316 that the plain text block is duplicated in the deduplication vault storage 108 (Yes at step 316), then the method 300 proceeds to step 322 of the analysis phase 304 where the location of the block on the source storage 110 is associated with the location of the duplicated block on the deduplication vault storage 108. Otherwise (No at step 316), the method 300 proceeds to step 318 of the analysis phase 304.

For example, where the current block is block 110(1) of FIG. 2, at step 314 a hash value of H7 would be calculated for block 110(1). At step 316 it would be determined that block 110(1) is duplicated as a plain text block in block 108(3) of the deduplication vault storage 108. The deduplication module 118 may then associate, at step 322, block 110(1) from the source storage 110 with the duplicated block 108(3) in the deduplication vault storage 108 in the portion of the metadata 116 that corresponds to the source storage 110. The method 300 may thus avoid encrypting block 110(1) and may thus avoid calculating a hash value for an encrypted form of block 110(1).

In another example, where the current block is block 110(2) or 110(4) of FIG. 2, at step 314 hash values of H18 and H3 would be calculated for blocks 110(2) and 110(4), respectively. At step 316 it would be determined that blocks 110(2) and 110(4) are not yet duplicated as a plain text block in the deduplication vault storage 108, and the method 300 would proceed to step 318.

In step 318, the block is encrypted using an encryption function. Examples of commonly used encryption functions include AES-128, AES-192, and AES-256. The key used in the encryption function may be a user-chosen key or some other key. A hash function may then be used to calculate an encrypted block hash value for the encrypted form of the block.

At decision step 320 of the analysis phase it is determined whether the encrypted block hash value matches a hash value of any encrypted blocks already stored in the deduplication vault storage 108 to determine whether the encrypted block is duplicated among the encrypted blocks in the deduplication vault storage 108. These blocks may have been stored in the deduplication vault storage 108 by the vault seeding module 122 in the vault seeding phase 302 or in the prior backup phase 306. The deduplication module 118 may, for example, use the encrypted block hash value calculated in step 318 to query the database 114 of the deduplication vault system 102 to determine whether a database element exists with a matching hash value. If a matching database element does exist, it is determined that the encrypted block is duplicated in the deduplication vault storage 108 (Yes at step 320). If a matching database element does exist and is associated with multiple source storages, the backup module may identify the block as corresponding to multiple source storages, designate the encrypted block as a common block, and replace the encrypted block with the corresponding plain text block in the deduplication vault storage. If a matching database element does not exist, it is determined that the encrypted block is not duplicated in the deduplication vault storage 108 (No at step 320).

If it is determined at step 320 that the encrypted block is duplicated in the deduplication vault storage 108 (Yes at step 320), then the method 300 proceeds to step 322 of the analysis phase 304 where the location of the block on the source storage is associated with the location of the duplicated block on the deduplication vault storage 108. Otherwise (No at step 320), the method 300 proceeds to step 324 of the analysis phase 304.

For example, where the current block is block 110(2) of FIG. 2, at step 318 a hash value of H13 would be calculated for the encrypted form of block 110(2). At step 320 it would be determined that the encrypted form of block 110(2) is duplicated as an encrypted block in block 108(5) of the deduplication vault storage 108. The deduplication module 118 may then associate, at step 322, block 110(2) from the source storage 110 with the duplicated block 108(5) in the deduplication vault storage 108 in the portion of the metadata 116 that corresponds to the source storage 110.

In another example, where the current block is block 110(4) of FIG. 2, at step 318 a hash value H3 would be calculated for the encrypted form of block 110(4). At step 320 it would be determined that block 110(4) is not yet duplicated as an encrypted block in the deduplication vault storage 108. Where a block is determined at step 320 to not be duplicated as an encrypted block in the deduplication vault storage 108 (No at step 320), the method 300 proceeds to step 324.

In decision step 324 of the analysis phase 304, it is determined whether all of the allocated blocks, or in the case of an incremental backup whether all of the changed allocated blocks, have been read from the source storage. For example, the deduplication module 118 may determine whether all of the changed allocated blocks have been read from the source storage 110 in FIG. 2. If it is determined at step 324 that all allocated (or changed allocated) blocks have not been read from the source storage 110 (No at step 324), then the method 300 returns to step 312 where the next allocated (or changed allocated) block is read from the source storage 110. Otherwise, if it is determined at step 324 that all allocated (or changed allocated) blocks have been read from the source storage 110 (Yes at step 324), then the method 300 proceeds to step 326 of the backup phase 306.

By the conclusion of the analysis phase 304, it will have been determined which allocated blocks from the source storage have already been duplicated as plain text blocks in the deduplication vault storage, which allocated blocks from the source storage have already been duplicated as encrypted blocks in the deduplication vault storage and which allocated blocks have not yet been stored in the deduplication vault storage. This determination may enable runs of nonduplicate blocks from the source storage to be strategically stored in the backup of the vault storage with little or no fragmentation of the runs. This maintenance of runs in a backup may be particularly useful during the subsequent restore phase 308 because it reduces the time spent seeking the blocks that make up the backup of the source storage 110, as discussed in greater detail below.

At step 326 of the backup phase 306, each unique nonduplicate encrypted block is read from the source system 104 and at step 328 of the backup phase 306, each encrypted block is stored in the deduplication vault storage 108. For example, the deduplication module 118 may read each unique nonduplicate encrypted block from the source system 104, and then the deduplication module 118 may store the encrypted block for each unique nonduplicate block in the deduplication vault storage 108. The encrypted blocks which were created at step 318 may be stored in a memory of the source system 104 or in the source storage 110 so that the encrypted blocks may be reutilized so that the encryption of each block is only performed once. Alternatively, where the encrypted blocks which were created at step 318 were not stored for later use, the encryption module 124 may re-encrypt each unique nonduplicate block. In one example, the encrypted form of block 110(4) of the source storage 110 may be read and stored as block 108(8) of the deduplication vault storage 108, as disclosed in FIG. 2. Upon each block being stored in the deduplication vault storage 108, a database element may be created in the database 114 that includes the hash value of the block and the location of the block in the deduplication vault storage 108 (see FIGS. 1 and 2). The hash value calculated at step 320 may be reutilized so that the hash value of each block is only calculated once.

At step 330 of the backup phase 306, the location of each unique nonduplicate block in the source storage is associated with the location of the corresponding block in the deduplication vault storage. For example, the deduplication module 118 may associate block 110(4) of the source storage 110 with the corresponding block 108(8) of the deduplication vault storage 108 by updating the portion of the metadata 116 that was created at step 322 that corresponds to the source storage 110.

By the conclusion of the backup phase 306, a backup of the source storage 110 will have been stored in the deduplication vault storage 108. Unlike a standard backup image, however, the backup of the source storage 110 as stored in the deduplication vault storage 108 will likely have been reduced in size due to the elimination of duplicate blocks within the backup. In addition, where multiple storages are backed up into the deduplication vault storage 108, the total overall size of the backups will likely be reduced in size due to the elimination of duplicate blocks across the backups. Finally, some of the blocks of the backup image may be blocks that make up common files, or files that have been designated as common files by an administrator or user of the deduplication vault system 102, and may be stored as plain text blocks, while other blocks of the backup image may be stored as encrypted blocks.

It is noted that the vault seeding phase 302 may be performed prior to, during, or after the backup phase 306. It is also noted that the steps of the analysis phase 304 and the backup phase 306 may be performed one-by-one for each allocated block in the source storage 110, instead of the analysis phase 304 being performed for all allocated blocks in the source storage and then the backup phase 306 being performed only after the conclusion of the analysis phase. In this manner, each allocated block would only be read once instead of being read twice.

At some point in time after the creation of a backup of the source storage 110, the optional restore phase 308 of the method 300 may be performed in order to restore the backup onto a storage, such as the restore storage 112.

At step 332 of the restore phase 308, each allocated block in the backup that was stored in the source storage 110 at the point in time is read from the deduplication vault storage 108. In decision step 334, it is determined whether the block is encrypted in the deduplication vault storage 108. If the block is not encrypted (No at step 334), then the method 300 proceeds to step 338 of the restore phase 308. Otherwise (Yes at step 334), the method proceeds to step 336 of the restore phase 308.

At step 336 of the restore phase 308, the encrypted block may be decrypted by the encryption module 124. The decryption may involve the same key as the encryption of step 318 of the analysis phase 304, and may be performed on the source system 104 so that the key need not be stored on the deduplication vault system 102. After the encrypted block from the deduplication vault storage 108 has been decrypted into a plain text block, the method 300 proceeds to step 338 of the restore phase. At step 338, each allocated plain text block that was stored in the source storage at the point in time is stored in the restore storage 112. For example, the deduplication module 118 may read each allocated block that was stored in the source storage 110 at time t(0) from the deduplication vault storage 108, decrypt any blocks that are encrypted, and store the plain text blocks in the restore storage 112 in the same position as stored in the source storage 110 at time t(0). For example, at the completion of step 338, the blocks of the restore storage 112 may be identical to the blocks of the source storage 110 disclosed in FIG. 2. Blocks 108(5) and 108(8) would be decrypted, then the plain text blocks, including 108(3), would be stored in the restore storage. Block 108(3) may not need to be decrypted because it was stored in the deduplication vault storage 108 as a plain text block.

During the step 332 of the restore phase 308, the previous maintenance of runs in the backup, which was made possible by the completion of the analysis phase 304 prior to the backup phase 306, may reduce the number of seek operations because reading each run only requires a single seek operation. Reducing the number of seek operations reduces the total time spent seeking the blocks during the reading of the blocks at step 332, thus resulting in increased efficiency and speed during the restore phase 308.

Also, as noted previously, since both the deduplication vault storage 108 and the source storage 110 may include runs in the sequence of a clean install of the files that make up the operating and software applications, the seeding of the deduplication vault storage 108 with plain text blocks may further increase the efficiency and speed during the restoration of the backup at steps 332-338 due to the blocks not needing extensive reordering or decryption when restoring from the deduplication vault storage 108 to the restore storage 112. This lack of a need of extensive reordering and decryption may be due, at least in part, to the fact that a clean install of the files that make up operating systems and/or software applications places the files, and the blocks that make up the files, in a generally defragmented sequence in the deduplication vault storage 108 and to the fact that the blocks have been stored in the deduplication vault storage 108 as plain text blocks.

It is understood that the foregoing discussion of the method 300 is but one possible implementation of a method of avoiding encryption of certain blocks in a deduplication vault, and various modifications are possible and contemplated. For example, the method may be modified to remove the steps or portions of steps that involve seeding the vault with common blocks. Thus, in some example embodiments, the deduplication vault storage may exclusively contain blocks that have been backed up from one or more source storages or may contain blocks that have been seeded and blocks that have been backed up from one or more source storages. The plain text common blocks, in some example embodiments, may exclusively include blocks that have been seeded; may include blocks that have been seeded, blocks that have been designated by an administrator or user as common blocks, and blocks that have been identified as common due to being associated with multiple source storages; or may exclusively include blocks that have been designated by an administrator or user as common blocks. Employing a seeded vault storage together with the ability to designate additional plain text blocks may be desirable in some embodiments because it allows for a greater number of blocks to be classified as plain text common blocks, thus requiring fewer blocks overall to be encrypted and stored in the deduplication vault storage.

Also, although the method 300 is discussed in the above example as being performed by the deduplication module 118, the vault seeding module 122, and the encryption module 124, it is understood that the method 300 may alternatively be performed by the deduplication module 118, the vault seeding module 122, or the encryption module 124 exclusively or by some other module or combination of modules.

The embodiments described herein may include the use of a special purpose or general purpose computer, including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose computer, special purpose computer, or virtual computer such as a virtual machine. Combinations of the above may also be included within the scope of computer-readable media.

Computer-executable instructions comprise, for example, instructions and data which cause a general purpose computer, special purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for avoiding encryption of certain blocks during a backup of a source storage into a deduplication vault storage, the method comprising:
   seeding the deduplication vault storage with common plain text blocks, the seeding the deduplication vault storage including:
      identifying an encrypted block stored in the deduplication vault storage that corresponds to multiple source storages;
      designating the encrypted block as a common block;
      obtaining a plain text block that corresponds to the encrypted block;
      replacing the encrypted block with the corresponding plain text block in the deduplication vault storage; and
      storing a hash value of the corresponding plain text block in a database or hash table such that the hash value is associated with the corresponding plain text block; and
   for each allocated plain text block in the source storage at a point in time, performing the following steps:
      analyzing the allocated plain text block to determine if the allocated plain text block is already stored in the deduplication vault storage;
      if the allocated plain text block is not stored in the deduplication vault storage, encrypting the allocated plain text block and analyzing the encrypted block to determine if the encrypted block is already stored in the deduplication vault storage; and
      if neither the allocated plain text block nor the encrypted block is already stored in the deduplication vault storage, storing the encrypted block in the deduplication vault storage.

2. The method as recited in claim 1, wherein the common plain text blocks include blocks that make up files of a standard operating system and/or files of a standard software application and/or blocks that have been designated by an administrator or user of the deduplication vault storage as common blocks.

3. The method as recited in claim 1, wherein the analyzing the allocated plain text block includes compressing the allocated plain text block.

4. The method as recited in claim 1, wherein the analyzing the allocated plain text block includes:
   hashing the allocated plain text block to produce a hash value;
   determining if the hash value matches a hash value of any plain text block already stored in the deduplication vault storage; and
   if the hash value matches any hash value of any plain text block already stored in the deduplication vault storage, determining that the allocated plain text block is already stored in the deduplication vault storage.

5. The method as recited in claim 4, wherein hash values associated with plain text blocks stored in the deduplication vault storage are stored in the database or the hash table.

6. The method as recited in claim 1, wherein the analyzing the encrypted block includes:
   hashing the encrypted block to produce a hash value;
   determining if the hash value matches a hash value of any encrypted block already stored in the deduplication vault storage; and
   if the hash value matches the hash value of any encrypted block already stored in the deduplication vault storage, determining that the encrypted block is already stored in the deduplication vault storage.

7. The method as recited in claim 6, wherein the storing the encrypted block in the deduplication vault storage further includes storing the hash value in the database or the hash table such that the hash value is associated with the encrypted block.

8. The method as recited in claim 7, wherein the encrypting the allocated plain text block includes encrypting the allocated plain text block using a user-chosen key.

9. One or more non-transitory computer-readable media storing one or more programs that, when executed, causes one or more processors to perform the method as recited in claim 1.

10. The method as recited in claim 1, further comprising reading, from the deduplication vault storage, and storing, in a restore storage, each allocated block that was stored in the source storage at the point in time in the same position as stored in the source storage at the point in time, wherein each encrypted allocated block is decrypted prior to being stored in the restore storage and each plain text allocated block is not decrypted prior to being stored in the restore storage.

11. The method as recited in claim 1, wherein the seeding the deduplication vault storage with common plain text blocks is performed prior to the point in time.

\* \* \* \* \*